D. J. HAVENSTRITE.
PLATE ICE MAKING AND HARVESTING APPARATUS.
APPLICATION FILED SEPT. 14, 1908.
936,452.
Patented Oct. 12, 1909.
2 SHEETS—SHEET 1.
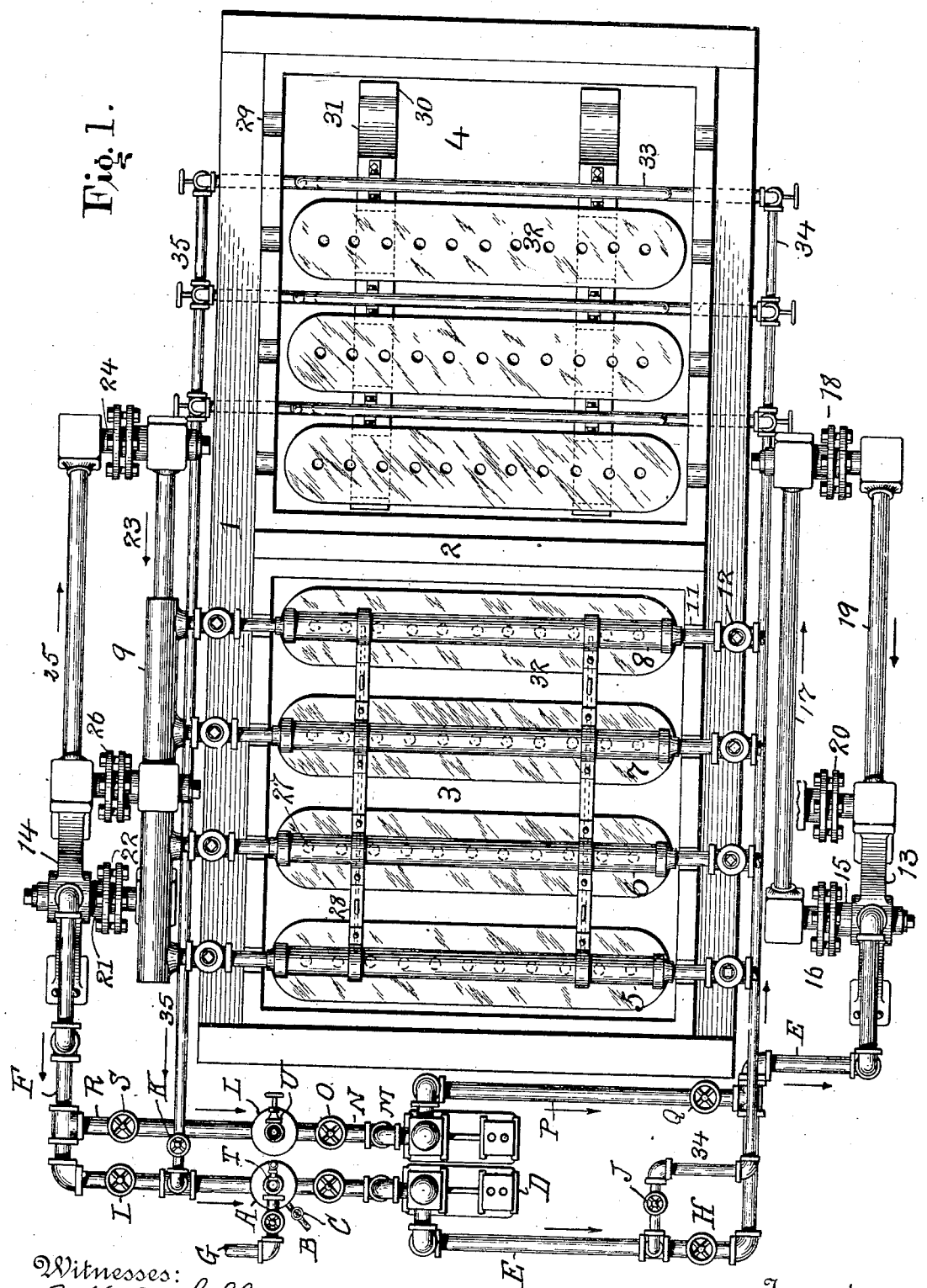

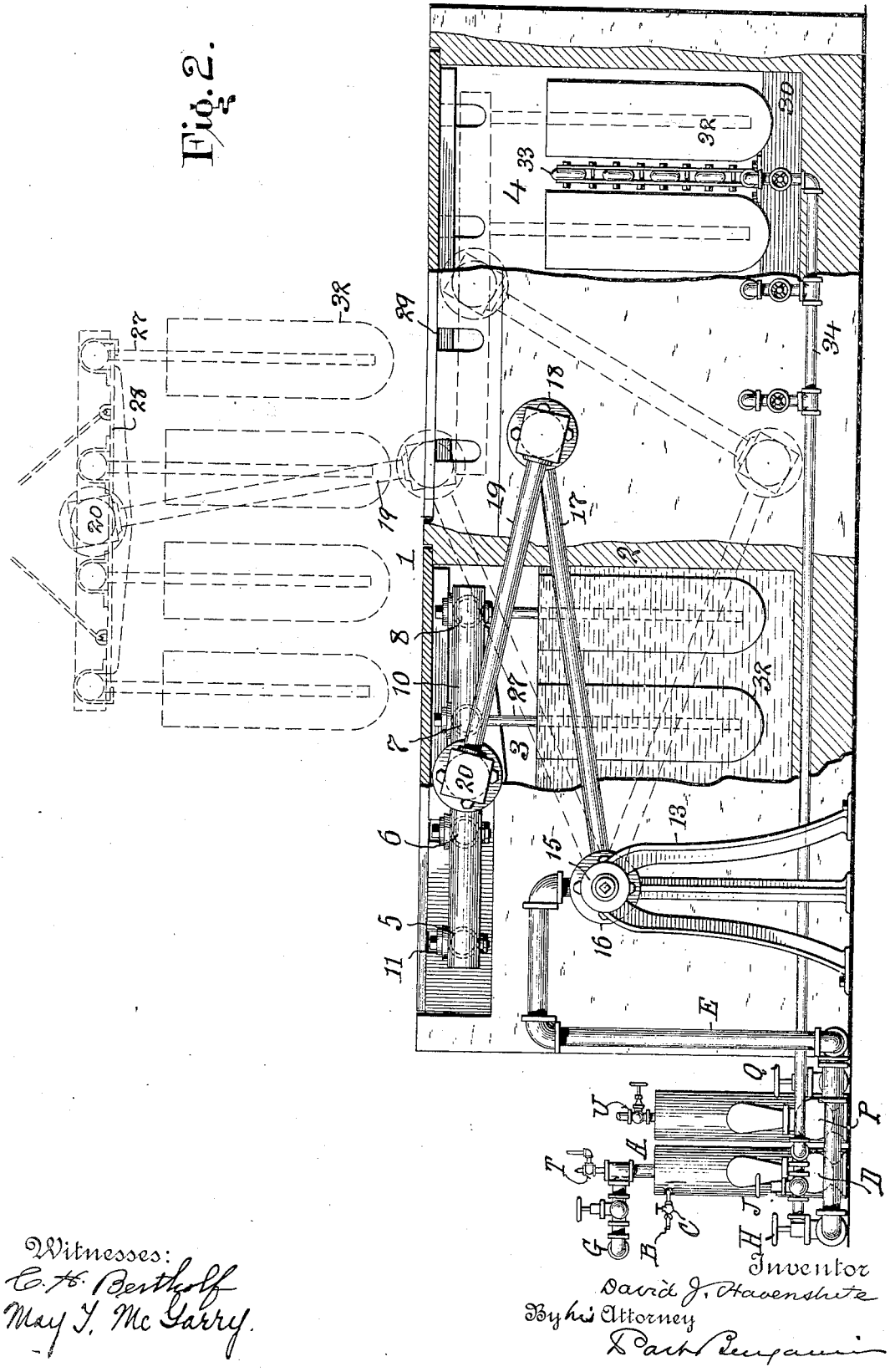

UNITED STATES PATENT OFFICE.

DAVID J. HAVENSTRITE, OF NEWARK, NEW JERSEY.

PLATE-ICE MAKING AND HARVESTING APPARATUS.

936,452.  Specification of Letters Patent.  Patented Oct. 12, 1909.

Application filed September 14, 1908. Serial No. 452,859.

*To all whom it may concern:*

Be it known that I, DAVID J. HAVENSTRITE, a citizen of the United States, residing at Newark, in the county of Essex and State of New Jersey, have invented a certain new and useful Improvement in Plate-Ice Making and Harvesting Apparatus, of which the following is a specification.

The invention relates to plate ice making and harvesting apparatus and consists broadly in the combination of a tank for containing water to be frozen, a removable freezing plate, a source of fluid refrigerant, and means for conveying said refrigerant to said plate: the said means being constructed to permit of removal of said plate from said tank without separation of said means and said plate.

In U. S. reissued Letters Patent No. 12,808, granted to me June 9, 1908, I have described an apparatus for making plate ice, which embodies a header disposed above and transversely across the tank containing the water to be frozen, from which header depend a multiplicity of tubes forming unitedly a freezing plate, through which circulation of refrigerating medium is maintained. The ice forming in cylinders upon the immersed surfaces of the tubes gradually increases in thickness until the cylinders meet, coalesce and produce a single cake which is adherent to all the tubes and free at its outer surfaces from the inner surfaces of the tank. The inlet and outlet pipes for the refrigerating medium being disconnected from the header, said header with the tubes and adherent ice cake is lifted from the tank. Pipes conveying warm liquid are then connected to the header, and by the circulation of said warm liquid through the tubes, the ice cake is thawed off.

In the apparatus herein shown as one embodiment of my present invention, the ice cakes are produced in like manner upon freezing tubes, but the construction is such that the freezing plate formed by said tubes may be removed from the tank without disconnecting from the supporting header, the pipe connections which supply either the refrigerating fluid or the warm fluid for thawing off, at will. The said construction is especially suited to the employment of a volatile refrigerant in the freezing plate, since it prevents the loss of such refrigerant and the escape of injurious fumes which would follow if the inlet and outlet pipes were disconnected from the header in order to permit of removal of the plate.

In the accompanying drawings—Figure 1 is a plan view of the apparatus. Fig. 2 is a side elevation, showing the freezing tank and the adjacent refrigerating chamber, each partly in vertical section.

Similar numbers and letters of reference indicate like parts.

1 is a containing vessel divided by a transverse partition 2 into two non-communicating compartments, one of which, 3, is the tank in which is placed the water to be frozen and the other, 4, is a refrigerated chamber in which the ice cakes are received during the thawing off operation, and in which they may be kept for a certain time for annealing purposes.

5, 6, 7, 8 are transverse headers forming a group, each header being connected at its ends to the longitudinal headers 9, 10, on opposite sides of the tank. The longitudinal header 10 is not shown in Fig. 1, being removed for clearer exhibition of the parts associated therewith. The headers 5, 6, 7, 8 are received in notches 11 in the side walls of the tank, and near their ends are provided with valves 12.

Secured to the floor on opposite sides of freezing tank 3, are standards 13 and 14. The standard 13 carries a sleeve 15 which, by means of a swinging joint 16, is connected to the end of a tubular arm 17. The arm 17 at its other extremity is connected by a swinging joint 18 to the end of another tubular arm 19, and the other extremity of said arm 19 is connected by a swinging joint 20 to the header 10. The standard 14 in like manner carries a sleeve 21 connected by swinging joint 22 to tubular arm 23, said arm being connected by swinging joint 24 to tubular arm 25 and arm 25 being connected by swinging joint 26 to header 9. The arms 17 and 23 and the arms 19 and 25 are alike in dimensions.

Depending from the headers 5, 6, 7, 8, are the freezing tubes 27 disposed vertically and parallel and constructed to permit a circulation of liquid through them, substantially as described in my aforesaid reissued Letters Patent. Each group of parallel tubes 27 forms a freezing plate upon which a cake 32 of ice is formed. The headers 5, 6, 7, 8, are also connected together by longitudinal stay pieces 28, so that said headers, with said stay pieces and longitudinal headers form a frame, and this frame with the depending tubes 27 may be lifted as a unit out of the tank by any suitable means, such as the traveling crane illustrated in my said reissued Letters Patent, and so transported to and from the refrigerating chamber 4. This removal and transfer of the aforesaid parts is permitted by the swinging joints connecting the tubular arms to one another and to the longitudinal headers and standard sleeves, as shown by dotted lines in Fig. 2, without requiring any separation of said arms from the freezing plates and without interrupting the continuity of the ducts or conduits formed by said arms between the standard sleeves and the headers.

The swinging joints may be of any suitable construction to permit the aforesaid movement of the arms, and they will preferably be provided with any suitable tightening means, such as flanges connected by take up bolts.

The refrigerating chamber 4 is provided with notches 29 in its walls to receive the headers 5, 6, 7, 8, and on its bottom may have supporting bars 30 provided with concavities 31 to receive the lower edges of the ice cakes 32 placed in them. Extending across the chamber are pipe coils 33 disposed between said concavities, the ends of said coils extending through the longitudinal walls of said chamber and being connected to outside longitudinal pipes 34, 35.

The devices for forcing volatile refrigerating medium to and through the apparatus are constructed as follows: A is a tank to which the medium is delivered from any suitable source by the pipe B containing an expansion valve C, until a sufficient quantity of said medium is accumulated in liquid form. This liquid is then forced by means of a pump D, through the pipe E to the sleeve 15 on standard 13 and thence by the tubular arms 17, 19, to header 10, and through headers 5, 6, 7, 8 and tubes 27 to header 9, thence by tubular arms 23, 25 to sleeve 21 on standard 14, and thence by pipe F back to tank A. The gas then goes back to the generator (compression machine) by the suction pipe G and the liquid falls to the bottom of the tank A to be again circulated by pump D. By reason of the refrigeration of the tubes 27, ice forms upon each of them and finally upon each row of tubes a single ice cake 32 is formed, which, at its periphery, is free from the inner surfaces of the tank. When the cakes have attained the desired thickness, they are lifted out of the tank 3, in the manner already described, and as shown in dotted lines, Fig. 2, and are deposited in the chamber 4. This chamber is cooled by means of the coils 33, which receive the refrigerating medium from the pipe 34 which connects with the pipe E. After circulating through said coils, said medium escapes by pipe 35 to pipe F and so goes to tank A. After the cakes have been placed in chamber 4, the tubes are thawed clear of them by the following means. The expansion valve C is closed. Valve H in pipe E, valve I in pipe F, valve J in pipe 34 and valve K in pipe 35 are also closed. This cuts off the supply of refrigerating medium to both the freezing tank 3 and chamber 4.

L is a tank in which is stored warm fluid, such as liquid anhydrous ammonia under the condenser pressure and, therefore, warm or above freezing temperature. A pump M communicates with this tank by pipe N in which is a valve O, and with pipe E by pipe P in which is valve Q. The tank also communicates with pipe F by pipe R in which is valve S. The tank L and pump M are, therefore, in a by-pass formed by the pipes P, N, R, so that when the valves H, I, J, K, are shut and the valves O, Q, S, are opened, said pump forces the warm fluid through the headers and tubes. This frees the ice cakes now in chamber 4 from the tubes, so that the tubes and headers may be lifted from the cakes and replaced in the freezing tank. The connections with tank L being closed and those with tank A reopened, a new ice cake is formed on the tubes as before.

At the top of tank A may be provided a safety spring valve located at T and connected to the ammonia condenser (not shown) to prevent undue pressure in said tank. Also on top of tank K may be provided a similar valve located at U, connected to the said condenser, and set at a pressure above that required for freezing and under the condensing pressure.

I claim:

1. In an ice making and harvesting apparatus, a tank for containing water to be frozen, a removable freezing plate, flexible connections secured to and communicating with said plate, a source of fluid refrigerant, a source of warm fluid, and means for diverting at will said refrigerant or said fluid into said flexible connections.

2. In an ice making and harvesting apparatus, a tank for containing water to be frozen, a removable freezing plate, a receptacle for said plate in proximity to said tank, flexible connections secured to and communicating with said plate and constructed to permit the transfer of said plate from said tank to said receptacle, a source of fluid refrigerant, a source of warm fluid, and means for delivering at will said refrigerant or said fluid into said flexible connections.

3. In an ice making and harvesting apparatus, a tank for containing water to be frozen, a removable freezing plate, standards on opposite sides of said tank, flexible pipe connections secured to said plate and said standards, a source of fluid refrigerant, and pipe connections between said source and said flexible connections for conveying said refrigerant.

4. In an ice making and harvesting apparatus, a tank for containing water to be frozen, a removable freezing plate, standards on opposite sides of said tank, swinging pipes jointed to one another and to said plate and said standards, a source of fluid refrigerant, and connections for conveying said refrigerant between said source and said swinging pipes.

5. In an ice making and harvesting apparatus, a tank for containing water to be frozen, a removable freezing plate, a source of volatile refrigerant, pipe connections secured to said plate and conveying said refrigerant, a source of warm liquid, pipe connections secured to said plate and conveying said refrigerant and said liquid, a pump for forcing said refrigerant through said connections and plate, a pump for forcing said warm liquid through said connections and plate, and means for establishing at will circulation in said plate of either said refrigerant or said warm liquid.

6. In an ice making and harvesting apparatus, a tank for containing water to be frozen, a removable freezing plate, a source of volatile refrigerant, pipe connections secured to said plate and conveying said refrigerant, a by-pass outside of said plate and across said pipe connections, a source of warm liquid in said by-pass and means for permitting either said refrigerant or said warm liquid to circulate through said pipe connections and freezing plate.

7. In an ice making and harvesting apparatus, a tank for containing water to be frozen, a header, a multiplicity of freezing tubes communicating with said header and depending therefrom, the said header with said tubes being removable from said tank, a source of liquid refrigerant, flexible pipes connected to said header and constructed to permit the removal of said header from said tank without separation of said pipes and header, and means for conveying refrigerant between said source and said pipes.

8. In an ice making and harvesting apparatus, a tank for containing water to be frozen, a receiving chamber in proximity thereto, means for refrigerating said chamber, a header, a multiplicity of depending tubes communicating therewith and depending therefrom, a source of refrigerating fluid, a source of warm fluid, flexible pipe connections secured to said header, and means for diverting either said refrigerating fluid or said warm fluid into said flexible connections: the said connections being constructed to permit the removal of said header and tubes from said tank to said chamber without separation of said connections and said header.

In testimony whereof I have affixed by signature in presence of two witnesses.

DAVID J. HAVENSTRITE.

Witnesses:
GERTRUDE T. PORTER,
MAY T. McGARRY.